Sept. 11, 1962 C. J. SMITH ETAL 3,053,209
APPARATUS FOR FORMING CONTAINERS
Filed April 2, 1958 9 Sheets-Sheet 1

INVENTORS
CLARENCE J. SMITH
HENRY G. HENRICKSON
BY JOSEPH E. DRUMMOND

James E. Toomey
Atty.

Sept. 11, 1962 C. J. SMITH ETAL 3,053,209
APPARATUS FOR FORMING CONTAINERS
Filed April 2, 1958 9 Sheets-Sheet 2

Fig. 2.

INVENTORS
CLARENCE J. SMITH
HENRY G. HENRICKSON
JOSEPH E. DRUMMOND
BY
James E. Tooney
Atty.

Sept. 11, 1962    C. J. SMITH ETAL    3,053,209
APPARATUS FOR FORMING CONTAINERS
Filed April 2, 1958    9 Sheets-Sheet 3

Fig. 3.

INVENTORS
CLARENCE E. SMITH
HENRY G. HENRICKSON
BY  JOSEPH E. DRUMMOND

James E. Tooney
Atty.

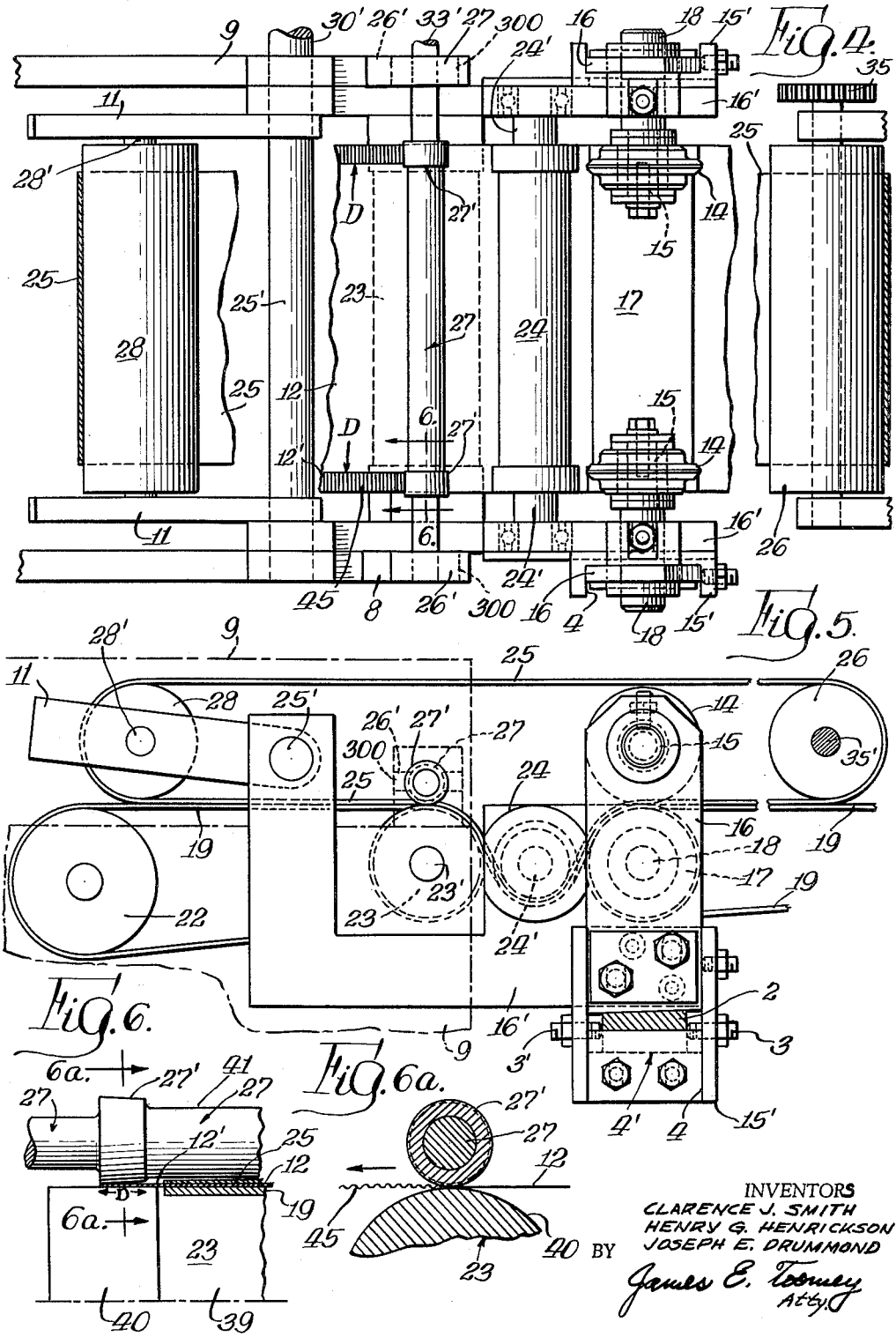

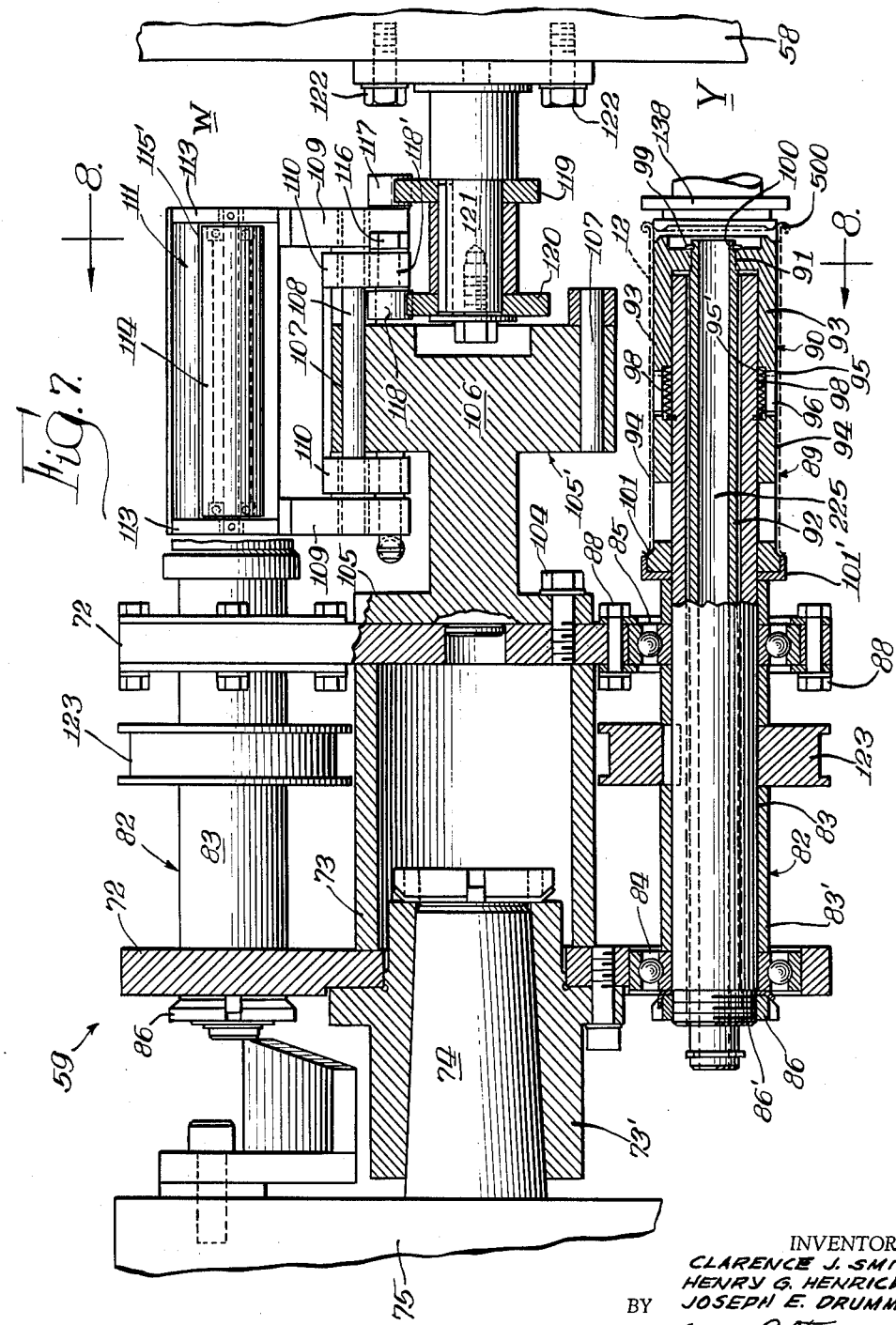

Sept. 11, 1962 C. J. SMITH ETAL 3,053,209
APPARATUS FOR FORMING CONTAINERS
Filed April 2, 1958 9 Sheets-Sheet 6
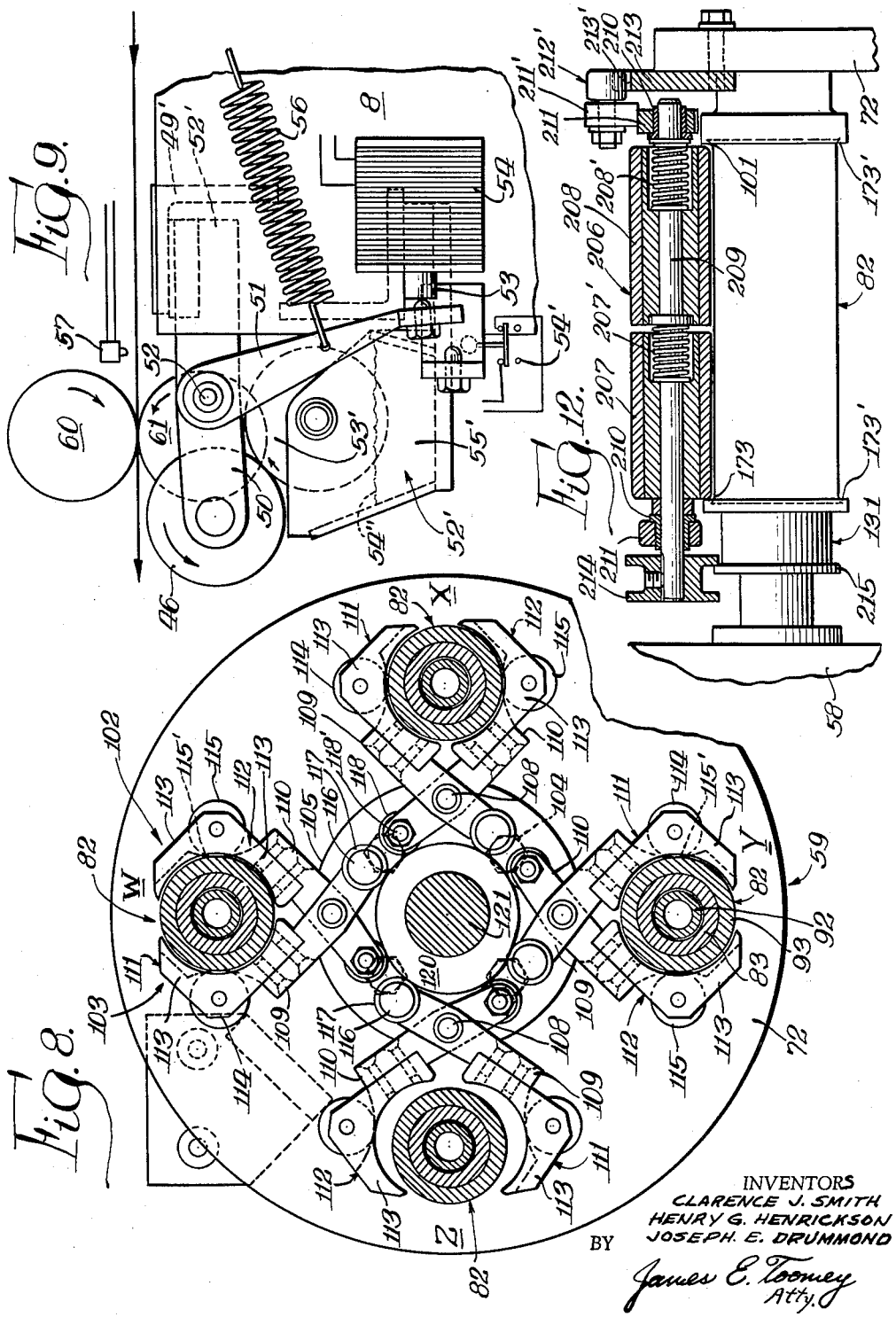
INVENTORS
CLARENCE J. SMITH
HENRY G. HENRICKSON
JOSEPH E. DRUMMOND
BY James E. Tooney
Atty.

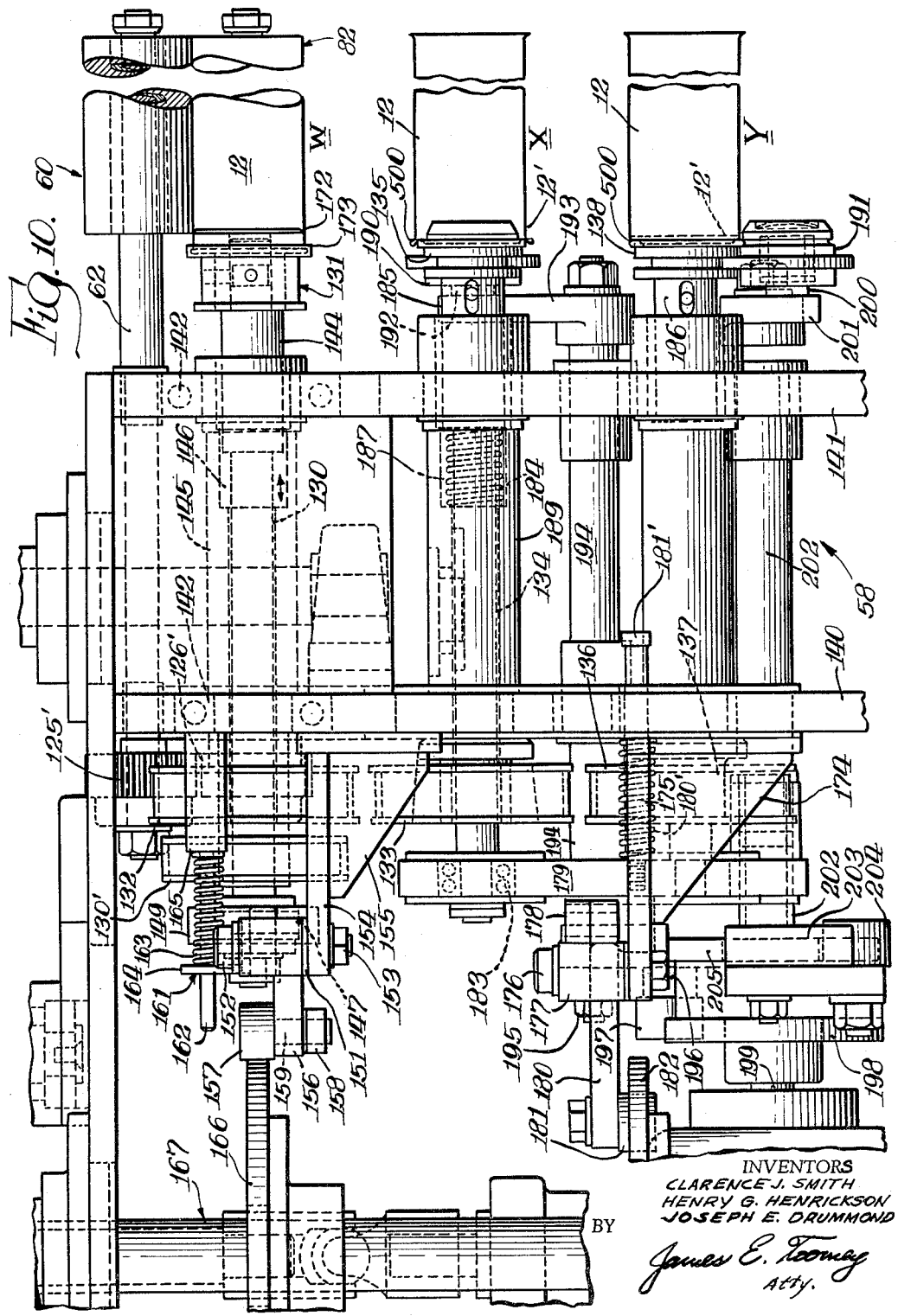

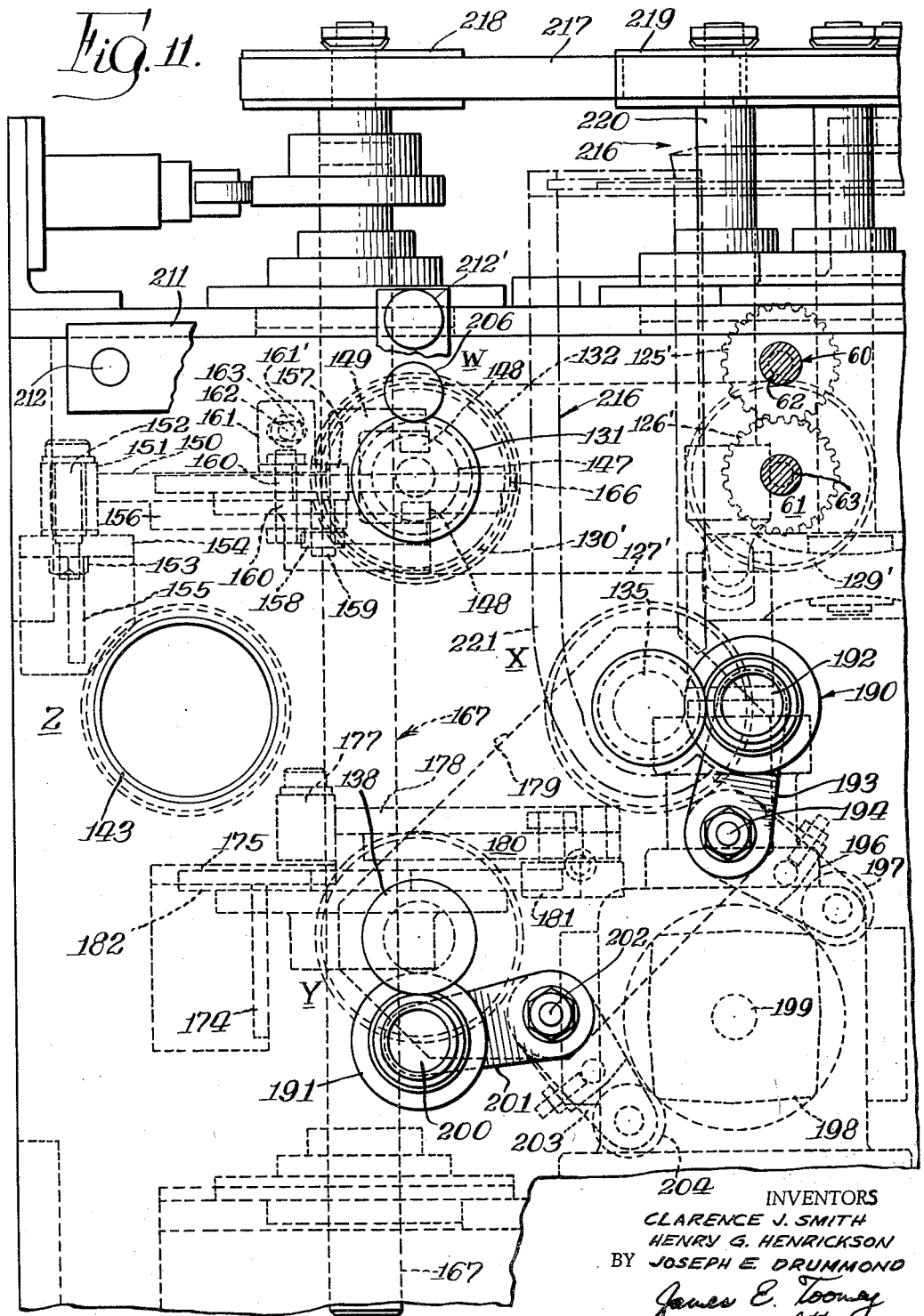

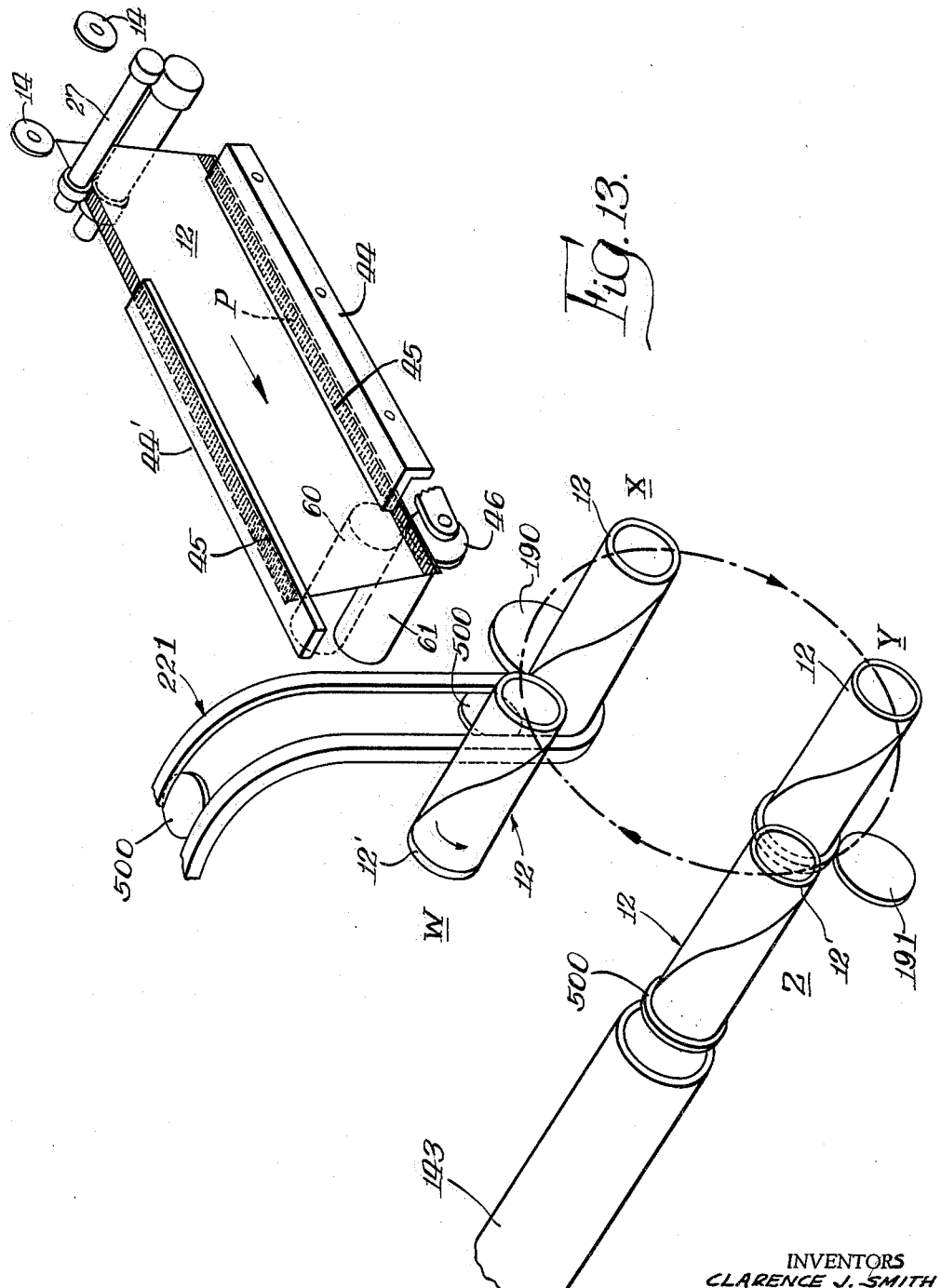

United States Patent Office 3,053,209
Patented Sept. 11, 1962

3,053,209
APPARATUS FOR FORMING CONTAINERS
Clarence J. Smith, Rockford, Henry G. Henrickson, Mount Prospect, and Joseph E. Drummond, Riverside, Ill., assignors, by direct and mesne assignments, to Kaiser Aluminum & Chemical Corporation, Oakland, Calif., a corporation of Delaware
Filed Apr. 2, 1958, Ser. No. 725,882
38 Claims. (Cl. 113—7)

This invention relates to the manufacture of tubular-like bodies such as container bodies from flat blanks. More particularly, it is concerned with providing a unique apparatus for the efficient, rapid and continuous fabrication of container bodies closed at one end from flat blanks of relatively stiff materials which ordinarily cannot be readily handled by conventional equipment, such as thin, stiff aluminum foil or sheet.

In the past, various machines have been designed for wrapping tubular-like bodies from flat blanks in a continuous operation such as turret-type wrapping machines. These prior art machines, however, are not capable of wrapping tubular bodies in an efficient, rapid and continuous manner from thin flat metal blanks such as those made from aluminum foil or sheet material and in particular, flat blanks made from thin full hard aluminum foil or sheet which is relatively stiff and ordinarily hard to work with.

The apparatus herein described constitutes improvements over such conventional wrapping machines and provides for a manufacturing operation wherein various blanks and in particular, thin, flat, stiff metal blanks can be wrapped into tubular-like bodies closed at one end in a continuous, efficient manner and at excellent production speeds.

It has been found that the application of end closures to convolutely wound tubular bodies made from thin, stiff and flat metallic starting material such as aluminum can be facilitated if the marginal edges of the blank are first expanded so as to provide excess material at the edges thereof in a unique fashion. This is particularly important in the case of full hard aluminum foil and sheet material which is relatively stiff and difficult to work with. Unless some means is provided in the case of this type of material for supplying an excess of material at the edges of the wrapped blank, the application of an end closure thereto usually results in fracturing, tearing or splitting of the foil or sheet. On the other hand in containers of this type it is advantageous to use full hard, thin aluminum foil or sheet material, which is relatively stiff in order to increase the strength characteristics in the body or wall of the container.

It is an object of this invention to provide a novel apparatus for forming containers from thin, flat metallic blanks and the like wherein special roll means are employed for pre-treating or expanding the edges of the blank so as to facilitate the later application of an end closure thereto.

Another object of this invention is the provision of an apparatus for flaring or flanging one or more edges of a previously treated flat blank, and after the blank has been wrapped into a tube-like body so as to facilitate the application of an end closure thereto.

Another object of this invention is to provide in combination with an intermittently rotating turret provided with wrapping mandrels a unique feeding arrangement for successively supplying previously treated flat blanks to the wrapping mandrels.

Another object of this invention is to provide in combination with an intermittently rotating turret novel flanging tool means for flaring or flanging the edges of a blank after it has been wrapped on a mandrel of the turret and wherein the mandrel itself is provided with certain of said flanging tool means.

Another object of this invention is to provide in combination with a rotating turret having a wrapping mandrel novel flanging tools and roll means for use in flanging and wrapping a flat, thin and relatively stiff metal blank on the wrapping mandrel.

Another object of this invention is to provide in combination with a rotating turret provided with one or more wrapping mandrels unique seaming tools for applying and securing an end closure to at least one end of a metal blank wrapped into a tubular-like body on the mandrel.

A further object of this invention is to provide in combination with an intermittently rotating turret device having one or more wrapping mandrels, unique flanging tool means for flanging one or more edges of a flat blank wrapped on a mandrel so as to facilitate the application of an end closure thereto, together with novel seaming tool means for applying and securing the end closure thereto prior to the time the blank is removed from the mandrel along with means for synchronizing the movements of all of the aforesaid elements with each other.

Another object of this invention is to provide a unique device for efficiently, continuously and rapidly winding a tube-like container body on an intermittently rotating turret-like apparatus provided with a wrapping mandrel, wherein the mandrel itself is provided with unique flanging means at one end thereof for forming a flared end on one marginal edge of a thin metallic blank wrapped on the mandrel so as to facilitate the application of an end closure thereto.

A further object of this invention is to provide a novel apparatus for pre-treating and then wrapping successive thin flat blanks such as those made of full hard temper aluminum foil or sheet and thereafter applying end closures thereto wherein the blanks are so handled that the problems normally incident to such operations are completely eliminated and full scale production speeds attained.

Other objects and advantages of the instant invention will become more apparent from a review of the following detailed description, when taken in conjunction with the appended drawings wherein:

FIG. 2 is an elevational end view of the apparatus shown in FIG. 1 when taken along line 2—2 thereof with parts removed and other parts shown in dotted lines for the sake of clarity;

FIG. 3 is a side elevational view of the apparatus shown in FIG. 1 when taken along line 3—3 thereof, with parts removed and others shown in dotted lines for the sake of clarity;

FIG. 4 is a broken plan view of a portion of the apparatus shown in FIG. 1, wherein the blank to be wrapped into a tube-like body is first pre-treated such as by scoring rolls and expanding rolls;

FIG. 5 is a broken side elevational view of the portion of the apparatus disclosed in FIG. 4;

FIG. 6 is a sectional view of the portion of apparatus shown in FIG. 4, when taken along line 6—6 thereof;

FIG. 6a is a sectional view taken along the line 6a—6a of FIG. 6;

FIG. 7 is a sectional view of the turret portion of the apparatus shown in FIGS. 1-3, and when taken along line 7—7 of FIG. 3 and with some parts added and other parts removed for the sake of clarity;

FIG. 8 is another sectional view of the turret portion of the apparatus, when taken along line 8—8 of FIG. 7;

FIG. 9 is an enlarged side elevational view of the adhesive roll means used to apply an adhesive to a predetermined portion of a flat blank prior to the wrapping thereof;

FIG 10 is an end elevational view of the apparatus and discloses the overall arrangement of the flanging and seaming tools associated with the intermittently rotating turret as well as the means for actuating these tools;

FIG. 11 is a side elevational view of the flanging and seaming tools shown in FIG. 10, with certain of the elements for actuating the tools being shown in dotted lines;

FIG. 12 is a sectional view of the nestable roll used to assist the flanging tool and mandrel in wrapping the tubular body and then flanging the opposing edges of the said body once it has been wrapped; and FIG. 13 is an overall schematic view of the general steps to be followed in the formation of a container body, while using the apparatus of the instant invention.

Figure 1:
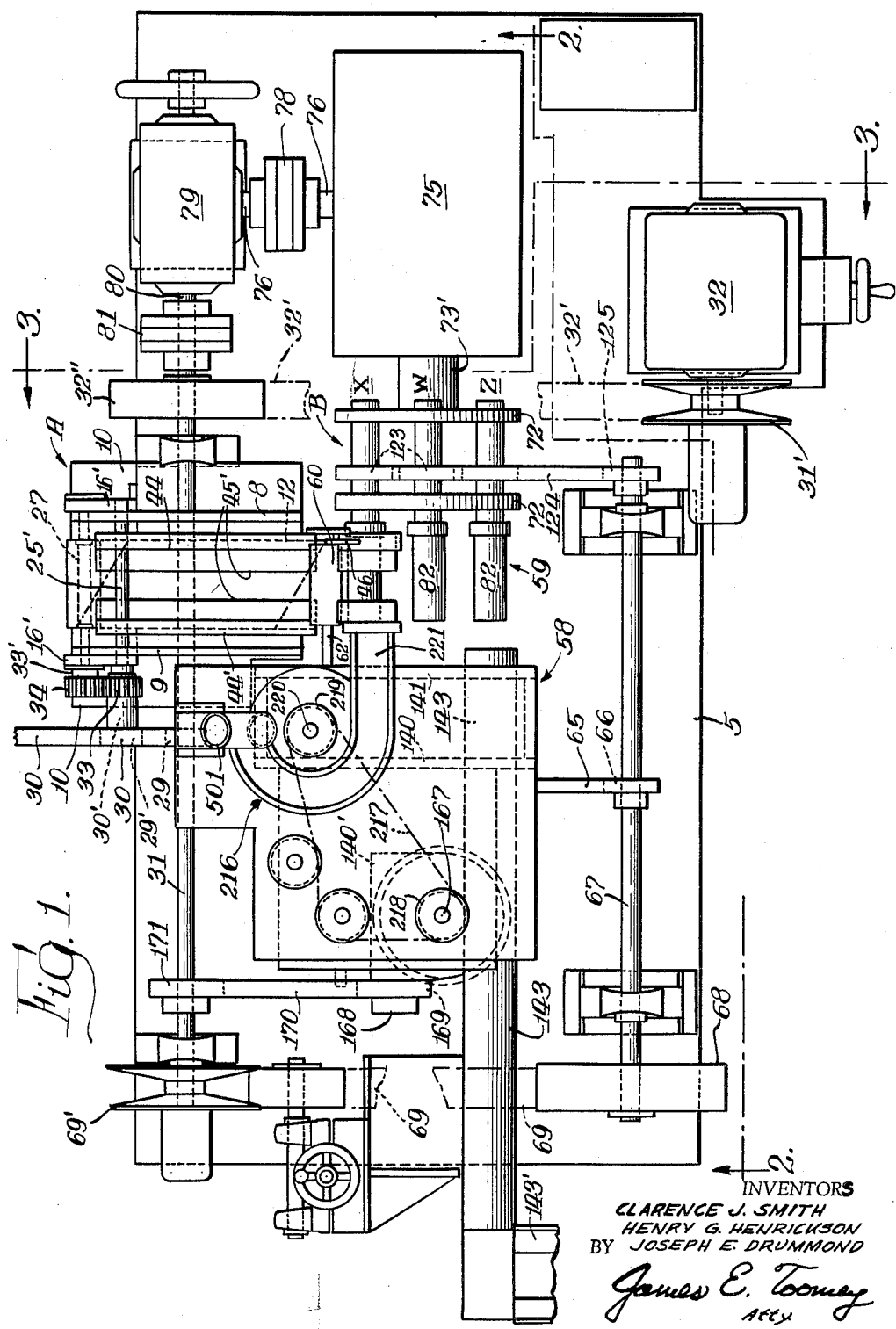
FIG. 1 is an overall plan view of the novel blank treating and wrapping apparatus of the instant invention with parts removed and with other parts shown in broad outline for the sake of clarity.

One form of apparatus that has been found suitable in practicing the instant invention is disclosed in the attached drawings. As indicated, particularly in FIGS. 1 and 3, this apparatus generally includes a blank pretreating zone designated as zone A, where a flat blank is first scored and the edges thereof expanded; and a wrapping zone B, which generally includes the intermittently rotating turrent device provided with wrapping mandrels, flanging and seaming tools, an end closure feeding device and an ejection mechanism.

With further reference to the drawings, the apparatus of the instant invention is generally comprised of a base frame or table 5 suitably mounted by means of the legs 6 upon the floor of a building. Disposed on the table 5 adjacent zone A are upstanding brackets 7 and secured to the brackets 7 are the spaced support plates 8 and 9. Each of these plates may be provided with a horizontal flange 10 secured to the lower extremity thereof. These spaced plates form a guideway or feeding channel for the flat metal blanks 12 which are fed intermittently to the apparatus by means of a conventional feeding device (not shown) disposed adjacent zone A. Located at zone A is the portion of the apparatus, where each of the flat blanks 12 have their edges expanded in order to facilitate the application of an end closure thereto after the blank is wrapped. The blanks are also scored at zone A. Although the instant apparatus may be employed to form tube-like bodies from various starting materials, such as paper board, paper and foil laminates etc., it is particularly adapted for use in making tube-like bodies from thin, flat blanks of full hard temper aluminum or aluminum alloy foil and sheet, which are relatively stiff, and difficult to work with under ordinary manufacturing conditions. By full hard temper is meant the degree of temper built into the aluminum during the rolling and consequent working thereof.

As indicated particularly in FIGURES 4 and 5, there is located within zone A a pair of scoring rolls 14 mounted upon the stub shafts 15 with each of the shafts 15 in turn being suitably journalled to an adjustable plate 16, slidably mounted within channel member 15' secured to a plate 16' by suitable bolt means. Plates 16 form extensions of the plates 8 and 9. To adjust the relative position of scoring rolls 14 to the blank 12, a wedge element 2 is slidably disposed by adjustable abutment means 3 and 3' within the vertically disposed slot 4 of the channel member 15'. The bottom portion of wedge 2 bears against the retaining member 4' affixed to the bottom portion of member 15'. These scoring rolls are employed to put score lines or lines of weakness at the points 12' spaced a predetermined distance inwardly from the free marginal ends of the blank to which end closures are applied. These score lines are incorporated in the blank to facilitate the later tearing away of the body of the tube from the end closures, when the container tube is opened by unwrapping the body from said end closures.

The scoring rolls 14 are also disposed over the bottom mating roll 17 mounted on shaft 18. Shaft 18 is journalled in openings in the side plates 16'. In addition to acting as a mating roll for the two scoring rolls 14, mating roll 17 also has the endless feed belt 19 trained therearound. This feed belt is of less width than the blank 12.

In addition to being trained about the mating roller 17, feed belt 19 is also trained about roller 20, tension roller 22, which is spring biased by means (not shown), the lower blank expander roller 23 and roller 24. Of these rollers, only roller 20 need be driven positively and roller 22 is spring biased so as to maintain the proper tension on the endless belt 19. Also secured to same shaft 21' to which roller 20 is attached is a driving pulley 20'. Shaft 21' is journalled in brackets (not shown) which may advantageously be affixed to the side plates 8 and 9. Roller 24 is disposed on shaft 24', the ends of which are located in openings in the side plates 16'. Roller 23 is disposed on shaft 23', the ends of which are located in openings in the side plates 8 and 9.

Belt 19 also serves as the bottom blank feeder in a pair of endless feed belts, the other feed belt being top feed belt 25. Feed belt 25, which is aligned with and located above feed belt 19, is trained about positively driven roller 26, rollers 18, 24, 23 and finally the adjustably disposed tension roller 28. Belt 25 clears the small roller 27 which constitutes a driving shaft for the two top blank expanding rollers 27'.

The ends of roller 27 are journalled in bearing members 26' adjustably disposed in the windows 300 located in the side plates 8 and 9 by suitable means (not shown). Roller 28 is mounted on shaft 28' disposed between the pivot arms 11. Pivot arms 11 are loosely affixed to shaft 25', the ends of which are disposed in plates 16'. One end of shaft 25' also extends through side plate 9 so as to serve as a support for a gear 33 and a pulley 29'. Certain of the aforesaid rollers and shafts are driven as follows from the main power source or motor 32. Motor 32 is adapted to drive a main drive shaft 31 through an adjustable pulley 31' and belt 32' with belt 32' acting to drive shaft 31 through the medium of pulley 32''. Affixed to an intermediate portion of shaft 31 is a conventional toothed driving pulley 29 about which is trained an interiorly toothed belt 30. Belt 30 is also trained about the drive pulley 29' on the extension 30' of the shaft 25'. The extension 30' of shaft 25' also carries a gear 33, which meshes with the gear 34 secured to the extension 33' on one end of shaft 27 for the expanding rollers 27'. Shaft 27 is only minutely adjustable and the gear train speed is low enough, so that no meshing problems exist between gears 33 and 34. Belt 30 is also trained about drive pulley 20' disposed on shaft 21'. As indicated in dotted lines in FIG. 3, one extremity of shaft 21' carries the drawing gear 34' which is adapted to mesh with the driving gear 35 on the shaft 35' for the driving roller 26 of the top blank feed belt 25.

As the motor 32 rotates, it will then cause a rotation of shaft 27 for the top expanding rollers 27' and the driving rollers for the endless belts 19 and 25. As indicated in FIGS. 1, 4 and 5, a flat blank 12 of suitable configuration, one of which might be that of a parallelogram with the leading and trailing edges being located at an angle of greater than 90° to the longitudinal edges is fed in between the belts 19 and 25. The belts progressively feed the blank 12 first beneath the scoring rolls 14, then underneath the roll 24 and then between the top and lower expanding rolls 27' and 23 respectively and finally, past the adjustably disposed belt driven rollers 22 and 28. As has been previously indicated, the width of the belts 19 and 25 are such that the side marginal edges of the blank and the areas D adjacent thereto are exposed. These are also the areas of the blank which later become secured to end closures, after the blank is wrapped into a tubular body. By being exposed, these marginal areas can then be readily subjected to the action of the scoring rolls 14 and the portions of the two expanding rolls 27' and 23 which perform the expanding operation.

In an advantageous embodiment of the invention and as indicated particularly in FIG. 6a, the lower expanding roll 23 has two diameters, an inner diameter 39 and an outer diameter 40. The inner diameter, since it is smaller than the outer diameter, in effect provides a pocket for the reception of the lower endless feed belt 19, whereby the endless belt will not interfere with the expansion of the areas D adjacent the marginal edge of the blank 12. The shaft 27 carries the two expanding rolls 27'. The rolls 27' have a generally flat surface, similar to that of roll portion 40 of roll 23 and in some instances depending on the results desired may be slightly tapered in an axial direction.

In any event, the inner diameter 41 of roll 27 is such that it will snugly accommodate and yet clear the top endless feed belt 25 whereby the blank 12 may be readily fed by belts 19 and 25 between the expanding rolls 27' and 23. As the blank is fed past these expanding rolls the score lines 12' which have been imposed thereon by means of the scoring rolls 14, will be disposed outside of the belts 19 and 25 and in line with the inner extremity of the outer diameter 40 of the lower expanding roll 23 and slightly offset inwardly from the inner edge of an expanding roll 27'. The area which is expanded, therefore, by the rolls, as indicated particularly in FIGS. 4, 6 and 6a will be that portion D of the blank 12 which begins a slight distance from the score lines 12' and extends outwardly to the free marginal edges of the blank, which parallel these score lines.

The action of the mating flat surface portions of the expanding rolls 23 and 27' upon the areas D of the blank is such that they cause gathering of the areas D in the form of flutes or corrugations 45 thereby expanding without flaring the blank 12 at these portions. This gathering or corrugating occurs in area D because the pressure exerted by rolls 27' and portion 40 of roll 23 causes the material in contact with the same to be extruded forwardly in the direction of travel of the blank. These extruded areas D, since they are still integral with the main body of the blank will naturally buckle or corrugate to compensate for their extended length as compared to the remainder of the blank. The frequency of the wave pattern for the corrugations also is dependent upon the diameters used for the rolls 27' and portion 40 of roll 23 and can be changed depending upon the results desired. At the same time, the expansion takes place in area D, the portions of the blank in these areas is reduced in thickness only a negligible amount, which is unimportant for all practical purposes. This fluting or corrugating of course, takes place along both marginal edges of the blank since, when the blank is wrapped, these marginal edges will then become the parts of the tube-like bodies to which end closures are attached.

After the blank is fed past the scoring rolls and expanding rolls 14, 23 and 27', it is kept in alignment with the various winding elements at zone B by means of the conventional guides 44 and 44' disposed on either side of the blank receiving sectionalized shelf 45' secured to plates 8 and 9. The guides 44 and 44' are adjustably secured to the shelf sections 45' in a manner well known in the art. As the blank passes from shelf 45' and guides 44 and 44', it is fed between a pair of accelerator rolls 60 and 61.

These rolls are disposed on shafts 62 and 63, which extend outwardly as indicated particularly in FIG. 10 from the one side of the box-like housing 58. They are also disposed to one side of the turret unit 59 located in the path of the blank. Rollers 60 and 61 are ultimately positively driven in a manner to be more fully described hereinafter by means of the endless belt 65 disposed about pulley 66 mounted on the drive shaft 67. Shaft 67 is ultimately connected to motor 32 through the medium of the drive pulley 68 on shaft 67, endless belt 69 trained about pulley 68 and pulley 69' on shaft 31. These accelerator rolls 60 and 61 are rotated at the same or approximately the same speeds as the mandrels on the turret unit and the seaming and flanging tools. These rolls are used to bring the feeding speed of the blank 12 up to that of the aforesaid elements used in wrapping the blank so as to prevent any abrasion or jamming during the feeding operation and to help insure that the blank will be fed to the turret unit 59 along a substantially linear path. Ordinarily, also, the trailing edge of the blank will be still engaged by the endless belts 25 and 19 at the time that the leading edge of the blank 12 reaches the accelerator rolls.

Although various arrangements may be employed for applying an adhesive to the underside of the blank 12 prior to the time it is wrapped in those instances, where the application of an adhesive is desired, to hold the windings of the blank together, the preferred embodiment of the present invention contemplates that an adhesive applying roller 46 be used which is of such a diameter and size that it will apply only a small amount or spot of adhesive to the underside of the blank 12 at an intermediate point on its length such as at point P as shown in FIG. 13. The reason for this is to provide a spot of pressure sensitive adhesive at the point on the blank, which will ordinarily be contacted by the leading edge of the blank as it is wrapped, whereby as the blank is wrapped the innermost wrap formed by the leading edge of the blank will be held securely to the outer wraps. This will not only facilitate the additional convolute winding of the blank but it will also hold the innermost wrap in place during the time the tube-like body or container formed from a blank 12 is filled on conventional filling equipment.

In an advantageous embodiment of the invention, the adhesive applying roller 46 is disposed adjacent the exit end of accelerator rolls 60 and 61 and to one side thereof. Roller 46, which is of a small width, is secured to the pivot arm 50 and this arm is secured to the linkage 51 by pivot pin 52. Pivot pin 52 is anchored by bracket 52' to the angle bracket 49' secured to plate 8. The lower extremity of the arm 51 is flexibly secured to the solenoid core 53 disposed in the solenoid 54. A suitable spring member 56 is employed to bias the pivot arm 51 against the operation of core 53. Solenoid 54 is adapted to be energized by a conventional photoelectric cell unit 57 disposed above the path of travel of the blank 12 and adjacent the entry end of rolls 60 and 61 in a manner well known in the art. A conventional limit switch 54' is disposed in the photoelectric cell circuit to deenergize solenoid 54 immediately at the end of the forward stroke of the core 53.

From the above, it will be readily observed that as the solenoid is alternately momentarily energized by the photoelectric cell unit 57 and then deenergized by limit switch 54' roller 46 will be caused to move upwardly and momentarily touch the undersurface of the blank 12 at the point P.

For the purpose of supplying adhesive to roller 46 a conventional adhesive holding pot 52' is employed. This pot which is affixed to plate 8 also contains the adhesive applicator roller 53' which enters the adhesive 54" in the pot and at the same time is journalled in the walls 55' of the pot. This roller may or may not be driven as desired. Roller 52' engages roller 46, when the latter moves downward under the action of spring 56.

As indicated particularly in FIGS. 2, 7 and 8, the turret unit 59, which may be of more or less conventional design, comprises a pair of round plates or discs 72 both of which are suitably secured such as by welding to a main cylinder housing 73. The innermost plate 72 is also fixedly secured to a bushing 73' fitted on shaft 74. Shaft 74 is connected to a conventional turret precision indexing unit 75 manufactured and sold by the Ferguson Machine and Tool Company of St. Louis, Missouri, under the name "Ferguson Indexing Drive," whereby the turret unit 59 will be intermittently rotated and there will be pauses in its rotation. Since this is a conventional unit, no description of the same is needed. This indexing unit 75 is adapted to be driven by motor 32, as indicated in FIG. 1, through the medium of shaft means 76, coupling 78, gears located in gear box 79, with the gears in the gear box in turn being driven by the shaft 80 connected by coupling 81 to the main drive shaft 31.

Rotatably mounted on the turret assembly 59 is a plurality of rotatable mandrel or spindle units 82 of which four are shown, although it is to be understood that any number may be used depending upon the results desired. As is indicated particularly in FIG. 7 each mandrel unit 82 generally comprises an elongated hollow member 83 concentrically disposed within the sleeve 83'. This sleeve along with member 83 are freely and rotatably mounted between the two plates 72 and 73 of the turret 59 by means of roller bearing assemblies 84 and 85. Suitable keeper units 88 are employed to maintain the roller bearing assemblies and mandrel units in place in at least one of the plates 72 along with the lock nut 86 disposed about the threaded end 86' of member 83. The wrapping portion 89 of the mandrel comprises a split or sectionalized cup-like element 90 provided with an opening 91 by means of which the cup-like element 90 may be slipped over the short stub of the innermost hollow tubular member 92. Member 92 is slip fitted within the hollow interior of element 83. The outside surfaces of the sections 93 and 94 of cup-like element 90 constitute the actual wrapping surfaces for the blanks 12. Section 93 of element 90 is provided with several openings 95 within which are received the tongues 96 on the other wrapping sleeve section 94. Sections 93 and 94 are also spring biased with respect to one another by means of the compression springs 98 disposed in the opening 95' between the tongue sections and the main tubular member 83 on the mandrel unit. The sleeve sections are held in place by means, for example, of a snap ring 99 disposed within the slot 100 in the innermost mandrel shaft 92. It will be noted by referring to FIG. 7 that the innermost wrapping sleeve section 94 is advantageously provided with a curved or flared portion 101 adjacent the flanged annulus 101' on the mandrel, the purpose of which will be described more fully hereinafter.

As particularly indicated in FIGS. 7 and 8, there is associated with each mandrel unit 82 a pair of elongated claw-like elements 102 and 103. These claw-like elements are mounted in the following fashion on the turret 59. Secured to the outermost plate 72 of the turret 59 by bolt means 104 is the innermost flange 105 of the reel-like element 105'. The outermost flange 106 of this reel 105' which is of greater width than the innermost flange 105 is provided with a series of bores 107. Mounted within these bores are pivot pins 108. Secured to the opposite extremities of each pivot pin is a pair of cross links 109 and 110, there being one pair of cross links for each extremity of the pin. Bridging the distance between the cross links 109 is a cross bar made in the form of an arcuate claw-like element 111. A similar cross bar 112 is also secured between the two cross links 110. Each cross bar has a pair of upstanding walls 113, which serve as journal supports for the rollers 114 on cross bar 111 and 115 on cross bar 112. The base of each cross bar is also hollowed out as at 115' so that the lower portions of rollers 114 and 115 may protrude therethrough.

Secured to the outermost cross link 109 such as by the bolt and shaft means 116 is a roller element 117. A similar roller 118 is secured by similar means 118' to the outermost cross link 110. The rollers 117 and 118 are adapted to engage the surfaces of the cams 119 and 120 disposed on the fixed spindle unit 121 which projects outwardly from the housing 58 and is anchored thereto by the bolt means 122. The surfaces of cams 119 and 120 are such that as the turret 59 rotates and carries the various mandrels 82 in a circle the claw-like elements 111 and 112 will open and close about the mandrels with which they are associated all as indicated in FIG. 8 so as to assist the mandrel in wrapping the blank 12 about a mandrel 82 in a manner to be more fully disclosed hereinafter.

In the device, as shown, four different indexing points or dwell points W, X, Y, Z are disclosed for the turret 59 and at all of the dwell points, except the last where the blank is ejected from the mandrel, the claw-like elements will ordinarily be in the position shown at the top of FIG. 8. As the blank leaves the accelerating rolls 60 and 61, it will be passed onto the mandrel 82 which is located in a topmost position, as indicated in FIG. 8. The turret unit 59, is so operated by the "Ferguson" indexing and driving unit 75 that it will index for 120° of its rotation and will dwell at the four stations disclosed for 240° of its rotation.

All during rotation and dwell of the turret 59, the individual mandrel arms 82 freely mounted on plates 72 will also be rotated. This is accomplished by means of the individual pulleys 123, which are secured to the mandrels 82 with the pulleys in turn being driven by the endless belt 124 entrained therearound. The endless belt is also trained about the main drive pulley 125 secured to shaft 67. A suitable tension roller 126 also bears against endless belt 124 so as to maintain proper tension on the same.

Mounted on the housing or cabinet 58 at the upper portion thereof is a shaft 130. Secured to the one extremity of this shaft, that is, the extremity which is adjacent the turret unit 59, is a rotatable flaring or flanging tool 131. Slidably keyed in a manner conventional in the art to the shaft 131 is a driving pulley 132 and the belt 65 which is trained about driving pulley 66 on shaft 67 is also trained about pulley 132. This same belt 65 is further trained about the driving pulley 133 disposed on a shaft 134 for the sealing tool 135 as well as driving pulley 136 disposed on shaft 137 for the other seaming tool 138. In this way, the rotational speed of the mandrels 82 will be coordinated with the rotational speeds of the various blank treating tools such as flanging tools 131 and seaming chucks 135 and 138, since they are all ultimately connected to and driven by the main drive shaft 67 as indicated above.

By further reference to FIGS. 10 and 11, it will also be noted that shaft 130 also carries pulley 130'. Pulley 130' is slidably keyed to shaft 130 in the same fashion as pulley 132. Trained about pulley 130' and the pulley 129' on shaft 63 for the lower accelerator roll 61 is an endless belt 127'. Mounted on shaft 63 is a driving gear 126', which meshes with gear 125' on shaft 62. As a result of this interconnection between the accelerator rolls 60 and 61 and the shaft 130 for flanging tool 131 the accelerator rolls will be driven at the same speed as the flanging tool 131.

All of the aforesaid shafts are freely journalled in the walls 140 and 141 of the box-like unit 58 through the medium of the conventional ball races 142.

In general, as the turret 59 rotates in a clockwise direction as viewed in FIGS. 3, 8 and 11 it will dwell at four positions or stations; namely, station W which is the topmost station; station X which is the next adjacent station; station Y which is the lowermost position and station Z which is the final ejection station. The blank 12 will be initially wrapped and the ends of the blank flanged or flared by means of flaring tools at station W. An end closure 500 from the stack 501 will then be applied and partially secured to the wrapped blank at the station X. The end closure 500 will then be completely applied at station Y. Finally, at station Z the completely wrapped blank closed at one end is ejected from the mandrel 82 in a manner well known in the art through an air discharge tube 143 and onto a collection slide 143'.

The above operations are accomplished as follows: Shaft 130 is slidably mounted within the ball races 142, as indicated in FIG. 10. The outer extremity of shaft 130 to which is secured the flanging tool 131, is provided with a sleeve member 144. This sleeve member fits directly within the ball race. The end of this sleeve member as well as shaft 130 fits within a secondary fixed sleeve member 145 mounted between the walls 140 and 141 of the casing 58. An annular pocket 146 is disposed in the secondary sleeve member 145 and the shaft 130 and sleeve member 144 is adapted to be slidably disposed within the pocket 146. Secured to the opposing end of shaft 130 is a grooved roller 147. The groove of this roller is adapted to receive the ball-like shoe elements 148 secured to the opposing ends of the U-shaped bracket 149, all as indicated particularly in FIG. 11. Bracket 149 contains an extension 150 at the web portion thereof which serves as a pivoting or actuating arm. Arm 150 is secured to the trunnion-like element 151 pivotally supported by the upstanding pin member 152 and bolt 153 in the horizontal plate 154. Plate 154 is secured by bracket means 155 to the side plate 140 of the housing 58. Arm 150 may be made in the form of a Y, one extension being secured to the bracket member 149 and the other extension serving as a holder 156 for the roller 157 mounted on the holder by means of the nut 158 and pin 159. Secured to the arm 150 by means of pin 160 is an angle bracket 161. Bracket 161 is provided with a horizontally slotted opening 161' for receiving the stud-like pin member 162. A helical compression spring 163 is disposed intermediate the flange 164 of the bracket 161 and the thickened portion 165 of the pin member 162, which is anchored to the wall 140. Roller 157 is adapted to be contacted by the surface of cam 166 mounted on the shaft assembly 167. Shaft assembly 167 is ultimately connected to the main power source 32 through the medium of suitable gear train including worm gears, etc., mounted in the housing 140. These gears are connected, as indicated in FIG. 1, to gear shaft 168, with the gear shaft 168 being provided with a sprocket type drive pulley 169 about which an endless interiorly toothed belt 170 is trained. Belt 170 is finally trained about a sprocket type driving pulley 171 mounted on the drive shaft 31. Thus, it will be readily seen, as the cam shaft assembly 167 rotates, that the cam 166 will engage roll 157 and cause the shaft 130 to which the flanging roll 131 is attached to reciprocate back and forth against the action of spring assembly 163 in a predetermined manner. This operation is also synchronized with the remaining operations of the machine. As the flanging tool 131 moves forward, the nose portion 172 thereof will enter the tubular body 12 shortly after it is wrapped on the rotating mandrel 82 located at station W. This nose portion 172 is also provided with a flaring curved section 173, which causes the marginal edge of the wrapped container body in contact therewith to be flanged or flared outwardly.

At the same time, as the left hand marginal edge of the container body 12, as shown in FIGS. 10 and 12 engages and creeps up the tapered or curved surface 173 of the nose portion 172 of the flanging tool 131, endwise pressure will also be exerted on the opposing end of the container body, where it engages the curved surface 101 of mandrel sleeve section 94 on mandrel 82 thereby causing the opposing marginal edge of the container body to also be flared outwardly. This double flaring of the blank is accomplished by the initial contact of the curved surface 173 with blank 12, so that it horizontally slides the blank to the right as viewed in FIGS. 10 and 12 and to the left as viewed in FIG. 7 such that the end of the blank opposite to curved surface 173 creeps or moves up on the curved surface 101 of mandrel 82. To assist the flanging tool 131 in this operation, a split mating roller 206 is employed in a manner to be hereinafter more fully described. The mating roller 206 is used both for the purpose of assisting the flanging tool 131 and the mandrel assembly 82 in obtaining the first initial wrap of the blank 12 about the mandrel assembly and thereafter flanging the ends of the wrapped blank. This mating roller thus not only seats against the split wrapping sleeve portion 94 of the mandrel assembly 82, but its ends must necessarily be of such a configuration whereby they will engage and force the blank to conform to the curved surface 173 on tool 131 and curved surface 101 on mandrel 82. This mating roller 206, therefore, is generally comprised of two sections 207 and 208. Both sections 207 and 208 are rotatably disposed upon the shaft 209. The ends of this shaft are slidably supported in bushings 210. Bushings 210 are snugly fitted in openings in the pivot arms 211 and arms 211 are pivotally suspended outwardly over the turret unit 59 by means of the spindle 212, which projects outwardly from the casing 58 as indicated particularly in FIG. 1. The outermost arm 211 contains an extension 211' and this extension carries a roller 212'. Roller 212' is adapted to engage a semi-cam element 213 secured to the outermost plate 72 of the turret 59. Cam element 213 is provided with a seat 213' for receiving the roller 212'. This seat 213' is so disposed with respect to the mandrel unit 82 that the roller 212' will fit in seat 213' at the time roller 206 is aligned with the opening between claws 111 and 112, which surround a mandrel unit 82. Also mounted on shaft 209 at the other end thereof from roller 212' is a flanged roll 214. This roll is adapted to engage the flange 215 on the flanging tool 131, when roller 212' is located in seat 213'. As the roll 214 engages the flanging tool abutment 215, roll 214 will be pushed to the right as viewed in FIG. 12, along with shaft 209. Movement of shaft 209 causes roller section 208 to shift to right against the action of spring 208'. At the same time, however, curved surface 173 on tool 131 will remain in substantial bearing engagement with roller section 207 due to the compressive action of spring 207' and with the blank edge held therebetween.

During the endwise shifting and engagement of tool 131 with the blank on mandrel 82, contact will also be established with mandrel sleeve section 93 causing it to move to the left as viewed in FIG. 7 and along with it tubular section 92, of mandrel unit 82 and against the action of springs 98 in the openings 95' of the mandrel unit 82. The curved surface 173 on flanging tool 131 as well as the curved surface 101 on mandrel unit 82 are both advantageously provided with blank abutting shoulders 173' which engage the free marginal edges of the blank during flaring. These shoulders are so dimensioned as to effect an equal flaring of both ends of the blanks.

In the meantime, of course, since the drive pulley 132 is slidably keyed to the shaft 130 the flanging tool will continue to be driven at the same rate of speed as the mandrel unit 82. After the initial wrapping and flanging at station W, turret 59 will operate to carry the mandrel 82 and the wrapped and flanged container body 12 to the next station X, but not before the flanging tool 131 moves back and out of the way. As the mandrel 82 and container body 12 reaches station X the rotating chuck 135 will move out picking up an end closure 500 and into engagement with the flared mouth of the container body wrapped on mandrel 82. During the same time another flat blank will be fed to the succeeding mandrel now located at station W. The two seaming chucks 135 and 138 are also interconnected whereby as the one seaming chuck moves out into engagement with a wrapped container so as to initially apply an end closure thereto at station X the second seaming chuck 138, which assists in the final end crimping operation also moves forward to engage the wrapped tubular blank located at station Y. It will be remembered, that chuck 135 is positively driven by means of the pulley 133 mounted on the shaft 134, therefore, while the shaft 137 for the second seaming chuck 138 is driven by the pulley 136 also located on this shaft. The arrangement whereby the two seaming chucks are secured to each other whereby they operate in unison will now be described. Disposed outwardly from the lower portion of the wall 140 of the housing 58 is a bracket member 174. This bracket member supports a horizontal plate 175. Pivotally secured to plate 175 by means of the pivot pin member 176, is the trunnion-like element 177 on the arm 178. The side portion of arm 178 is welded or otherwise secured to the cast plate 179. Projecting outwardly from arm 178 at the side thereof which is opposite to the vertically disposed cast plate 179 is another roller supporting arm 180 which freely supports the roller element 181. Roller element 181 is adapted to contact the surface of the horizontally disposed cam 182 affixed to the cam shaft assembly 167. As this cam 182 rotates on shaft assembly 167, it will cause the reciprocation of the arm 180 to which roller 181 is attached and in turn will cause movement of arm 178 along with the vertically disposed cast element 179 inwardly. Since shaft 134 for the primary seamer chuck 135 and the shaft 137 for the secondary seaming chuck 138 are fixedly journalled to the same casting 179 by means of the ball and race elements 183 of which only one is shown, both shaft 134 for chuck 135 and shaft 137 for chuck 138 will also be moved inwardly in unison against the action of compression spring 180' which surrounds a shoulder pin 181' that projects outwardly through wall 140 and is anchored to casting plate 179. Disposed about each of the shafts 134 and 137 is a compression spring 184. Since each spring is disposed about the several drive shafts 134 and 137 in a similar fashion, a description of the arrangement of one will not suffice for both. By reference to FIG. 10, it will be noted that the opposing edges of the shaft 134 and 138 adjacent the turret unit 59 are provided with sleeve members 185 and 186. Sleeve member 185 along with a portion of shaft 134 is adapted to fit within the annular channel or chamber 187 in the elongated fixed sleeve member 189 located intermediate the two walls 140 and 141 of the housing 58. Thus, as the vertically disposed cast plate 179 along with the shaft 134 move to the right as viewed in FIG. 10, they will act against the compression spring 184. The spring is so set as to limit the pressure exerted by the chucks 135 and 138 on the wrapped blank 12 for properly seaming the container. As has been indicated above, since each of these shafts 134 and 137 have the driving pulleys 133 and 136 slidably affixed thereon by conventional key means (not shown) rotation of the shafts as well as the primary and secondary seaming chucks 135 and 138 will continue even though the shafts themselves are moved axially.

In a further advantageous embodiment of the invention, and as particularly indicated in FIGS. 10 and 11 means are also provided during the movement of seaming chucks 135 and 138 forward for causing the mating of suitable primary and secondary end seaming rolls 190 and 191 with seaming chucks 135 and 138. When rotating seaming chucks 135 and 138 are moved to the left, as indicated in FIG. 10, or to an inoperative position the seaming rolls will also be disposed in an inoperative position and outwardly from the seaming chucks. Each of these seaming rolls or seamers 190 and 191 is freely rotatable and is not positively driven. The seamer 190 is rotatably disposed on a stub shaft 192 and shaft 192 is journalled on a lever arm 193. Lever arm 193 is secured to the extended pivot shaft 194 mounted between the side walls 140 and 141 of the housing 58. The extremity of shaft 194 which is opposite to that to which arm 193 is connected extends outwardly from plate 179 so as to be affixed by means of the bolt 195 to the roller carrying arm 196, as particularly indicated in FIG. 11. Arm 196 supports a cam engaging roller 197. Roller 197 is adapted to engage the cam 198 disposed on shaft 199 with shaft 199 in turn being connected by suitable means (not shown) either to the drive shaft 31 or drive shaft 67. The secondary seamer 191 is freely and rotatably mounted on a stub shaft 200 and stub shaft 200 in turn is secured to the one extremity of the lever arm 201. Lever arm 201 is mounted at its other extremity on the pivot shaft 202 and this shaft 202 extends in the same manner as shaft 194 between the upstanding members 140 and 141 of housing 58 through the vertically disposed casting member 179. The extremity of shaft 202 opposite to that to which the seamer 191 is attached is fixed to the lever arm 203 with this lever arm in turn supporting the roller 204. Roller 204 engages the cam 205 mounted on the cam shaft 199 in the same fashion as cam 198. Since the shafts 194 and 202 are rigidly but rotatably secured to the vertically disposed cast plate 179 movement of shafts 194 and 202 at the time the sealing chucks 135 and 138 are moved outward will also be effected. This movement will also take place at a predetermined time after the seaming chucks 135 and 138 have been first drawn into engagement with the indexed mandrels 82 and the wrapped container bodies thereon. At this time, the various cams 205 and 198 will operate to cause movement of the seaming rollers 190 and 191 into a mating engagement with their respective seaming chucks so as to apply and then crimp an end closure about the one marginal end of a wrapped container body.

By further reference to the drawings, it will be observed that finished end closures are deposited at station X by a conventional feeding unit 216, the moving parts of which are driven by an endless interiorly toothed belt 217 trained about a pulley 218 on shaft assembly 167 and a pulley 219 on the drife shaft 220 for the feeder unit. The feeder 216 causes successive end closures 500 to be intermittently removed from the stack 501 in timed relation to operation of the other portions of the apparatus and to be directed along the curved and downwardly extending trackway 221 until they come to rest on the ledge 222 located adjacent station X, and the leading edge of the first seaming chuck 135. As the seaming chuck 135 moves out it engages and carries the end closure ahead with it and off the ledge. The closure is of such a configuration that it will mate with and be carried by the chuck so that no dropping or jamming of the end closure 500 occurs.

After the wrapped body has an end closure completely applied thereto at the final or lowermost station Y, it is then directed upwardly to station Z where it is aligned with an air discharge tube 143. Air is then directed through the bore 225 in the mandrel 82 and against the end of the wrapped body closed by end closure 500 whence the wrapped body will be blown off of the mandrel and through the air tube 143 to the collection slide 143' or other handling apparatus.

An advantageous embodiment of the invention has been herein disclosed and described. It will be understood that various changes and modifications may be made therein without departing from the spirit and scope thereof as defined by the appended claims wherein what is claimed is:

1. An apparatus for forming tubular bodies from flat thin metallic blanks and the like comprising the combination of mating roller means provided with flat surface portions for expanding without flaring the edges of the blank, a rotating turret means, at least one wrapping mandrel on said turret means, means for feeding the blank after its edges are expanded along a substantially linear path to the said mandrel, and means associated with said mandrel for effecting a wrapping of the blank about the mandrel.

2. An apparatus as set forth in claim 1 including a common drive means for said expanding means, said mandrel feed means and said turret means.

3. An apparatus for forming tubular bodies from thin stiff flat metallic blanks and the like comprising the combination of roll means provided with mating flat surface portions for expanding without flaring the edges of a blank, a rotating turret means, at least one rotatable wrapping mandrel on said turret means, means for feeding the blank along a substantially linear path after its edges are expanded to the said mandrel, expandable claw members surrounding the said mandrel and operable upon the rotation of said mandrel to effect a wrapping of the blank on the mandrel.

4. An apparatus for forming tubular bodies from thin stiff flat metallic blanks and the like comprising the combination of roll means provided with mating flat surface portions for expanding without flaring an edge of a thin flat blank of relatively stiff material so as to facilitate the application of an end closure thereto, a rotatable wrapping mandrel, means for wrapping the blank about the mandrel and means for feeding the blank once its edge is expanded to said mandrel along a substantially linear path.

5. In a device of the type described for expanding a marginal edge of a thin stiff metallic blank and the like which is wound into a tube so as to facilitate the application of an end closure thereto, the combination of a pair of mating roll elements having flat surface portions between which an edge of the blank is passed, one of said roll elements which contacts the edge of the blank being of smaller diameter than the portion of the other roll element which also contacts the same edge of the blank, whereby as the blank passes between said roll elements a gathering of the blank will occur at the said edge in the form of flutes, common drive means for said pair of mating roll elements, a rotatable wrapping mandrel, means for wrapping the blank about the mandrel and means for feeding the blank once its edge is expanded to said mandrel along a substantially linear path.

6. A device of the type set forth in claim 5, wherein the said roll elements are axially tapered.

7. In a machine for making tubular bodies from thin stiff flat metallic blanks and the like the combination of roll means provided with mating flat surface portions for expanding without flaring an edge of the blank so as to facilitate the application of an end closure thereto, a rotatable wrapping mandrel, means for feeding the blank once its edge is expanded to said mandrel, means for wrapping the blank about the mandrel and a flaring tool engageable with said blank after it has been applied to and wrapped on the mandrel for flaring the expanded edge of the blank to further facilitate the application of an end closure thereto.

8. In a machine of the type described for making tubular bodies from flat metallic blanks and the like, the combination of roll means provided with mating flat surface portions for expanding without flaring an edge of the blank so as to facilitate the application of an end closure thereto, indexing turret means, a wrapping mandrel mounted on said turret means, means for feeding the blank once its edge is treated to said turret means and said mandrel, means associated with said mandrel for effecting a wrapping of the blank about the mandrel, and a flaring tool engageable with the expanded edge of the blank after it has been wrapped on the mandrel for flaring the said expanded edge of the blank to further facilitate the application of an end closure thereto.

9. In a machine of the type described for making tubular bodies from flat blanks and the like, the combination of roll means provided with mating flat surface portions for expanding without flaring spaced parallel edges of the blank so as to facilitate the application of end closures thereto, a wrapping mandrel, means for feeding the blank once its edges are treated to said mandrel, means for wrapping the blank on the mandrel, means on one end of said mandrel for flaring one expanded edge of the blank, and a flaring tool movable into and out of engagement with the other expanded edge of the blank, said flaring tool being adapted upon engagement with said last mentioned expanded edge of the blank after it is wrapped to force said first mentioned edge of the blank into contact with the flaring means on the mandrel whereby both edges of the blank will be simultaneously flared to thereby further facilitate the application of end closures thereto.

10. In a machine of the type described for making tubular bodies from thin flat blanks wherein the edges thereof are expanded without flaring to facilitate the application of end closures thereto the combination of an indexing turret, a wrapping mandrel mounted on said turret, means for feeding an expanded blank to said turret and the mandrel thereon, means for wrapping the blank on the mandrel, a flaring tool movable into and out of engagement with the wrapped blank on the mandrel when the turret is indexed and the mandrel moved to one station, said flaring tool being adapted upon engagement with the blank to flare an edge thereof so as to further facilitate the application of an end closure thereto, and means including seaming chucks and rollers for applying and securing an end closure to the flared edge of the blank when the turret is further indexed and moved to another station.

11. A machine for making tubular bodies from flat blanks wherein the edges of the blank have been expanded without flaring to facilitate the application of end closures thereto, comprising the combination of an indexing turret, a wrapping mandrel mounted on the turret, means for feeding an expanded blank to the turret and the said mandrel, means for wrapping the blank on the mandrel, means on one end of the mandrel for flaring one edge of the blank, a flaring tool movable into and out of engagement with the wrapping blank on the mandrel when the turret is indexed and the mandrel is moved to one station said flaring tool being adapted upon engagement with the blank to flare another edge of the blank and to cause the first mentioned edge of the blank to engage the flaring means on the mandrel, and means including seaming chucks and rollers for applying and securing an end closure to one of the flared edges of the wrapped blank.

12. A machine as set forth in claim 11 including cam means for actuating said flaring tool.

13. In a machine for making tubular bodies from flat blanks, wherein the edges of the blank have been expanded without flaring to facilitate the application of end closures thereto, the combination of a turret means, a wrapping mandrel mounted on said turret means, means for feeding the expanded blank to the turret means and mandrel thereon, means for wrapping the blank on the mandrel, a flaring tool movable into and out of engagement with the wrapped blank on the mandrel when the turret means is indexed to one station, said flaring tool being adapted upon engagement with the wrapped blank to flare an edge thereof to further facilitate the application of an end closure thereto and means associated with said mandrel and operable upon the engagement of the flaring tool with the one edge of the blank to flare another edge of the blank.

14. The machine as set forth in claim 13 including roll means nestable with said flaring tool and mandrel for assisting said flaring tool and mandrel in the flaring of the blank edges.

15. The machine as set forth in claim 13 including means for applying and securing an edge closure to a flared end of the blank when the turret means and mandrel are moved from the flaring station to another station.

16. In combination with an axially compressible wrapping mandrel, an axially compressible nesting roll for assisting the wrapping mandrel in wrapping a flat blank into a tube and means including a flaring tool engageable with said roll and mandrel for flaring an edge of the blank after it is wrapped on the mandrel.

17. A machine for making tubular bodies from flat blanks, wherein an edge of the blank has been first expanded without flaring to facilitate the application of an end closure thereto, comprising the combination of a turret means, means for feeding an expanded blank to the turret means and mandrel thereon, means for wrapping the blank on the mandrel, a flaring tool movable into and out of engagement with the wrapped blank on the mandrel when the turret means is indexed to one station said tool being adapted upon engagement with the wrapped blank to flare the expanded edge thereof to further facilitate the application of an end closure thereto, and means nestable and engageable with said tool and mandrel for assisting the flaring of the blank edge.

18. A machine as set forth in claim 17 and including means for applying and securing an end closure to the flared edge of the blank when the turret means and mandrel are moved from the flaring station to another station.

19. A machine as set forth in claim 17 including movable claw-like means surrounding the said mandrel, said claw-like means being of such a structure as to assist in the wrapping of the blank about the mandrel without at the same time interfering with the operation of the means used to assist the said flaring tool and mandrel in the edge flaring of the blank.

20. A machine for making tubular bodies from flat metallic blanks comprising the combination of a rotatable turret means, a wrapping mandrel mounted on said turret means, means for feeding a flat blank to the turret means and the mandrel thereon, means for wrapping the blank on the mandrel, a flaring tool movable into and out of engagement with the wrapped blank on the mandrel when the turret means is indexed to one station, said tool being adapted to flare a previously expanded but unflared edge of the blank to facilitate the application of an end closure thereto, means for applying and securing an end closure to the flared edge of the blank when the turret means and mandrel are moved from the flaring station to another station and means for operating said flaring tool and end closure applying and securing means in synchronism with the indexing and rotation of the turret means.

21. The machine as set forth in claim 20 including roll means nestable with said flaring tool and mandrel for assisting in the flaring of the blank edge.

22. The machine as set forth in claim 20 wherein the means for wrapping the blank includes roller claw-like elements surrounding said mandrel for use in assisting in the wrapping of the blank about the mandrel.

23. The machine as set forth in claim 20 wherein said mandrel feed means includes accelerator rolls for synchronizing the feeding speed of said blank to the mandrel with the rotational movements of said turret means.

24. A device of the type described for use in the production of tubular bodies from thin flat stiff metallic blanks and the like comprising the combination of roll means provided with mating flat surface portions for expanding without flaring an edge of a flat blank to facilitate the application of an end closure thereto, a rotating turrent means, at least one wrapping mandrel on said turret means, means associated with said mandrel for effecting a wrapping of the blank on the mandrel, and means for feeding the flat blank to the turret means and mandrel after the edge thereof has been expanded, said feeding means including accelerator rolls for synchronizing the feeding speed of said blank to the mandrel with the rotational movement of the turret means.

25. A device as set forth in claim 24 wherein the means associated with said mandrel for effecting a wrapping of the blank on the mandrel include movable claw-like elements surrounding the mandrel.

26. A device as set forth in claim 24 wherein the means associated with said mandrel for effecting a wrapping of the blank on the mandrel include a roll element engageable with the mandrel.

27. A device as set forth in claim 24 including a flaring tool movable into engagement with the expanded edge of said blank after the blank is wrapped on the mandrel to further facilitate the application of an end closure to said blank, and means for synchronizing the movements of said tool with those of the turret means and mandrel.

28. A device as set forth in claim 27 including means for applying and securing an end closure to the flared edge of the blank, and means for synchronizing the movements of said end closure applying and securing means with those of the turret means and mandrel.

29. A device of the type described for forming tubular bodies from thin flat metallic blanks and the like comprising the combination of roll means provided with mating flat surface portions for expanding without flaring spaced edges of a flat blank to facilitate the application of end closures thereto, a rotating turret means, at least one rotatable wrapping mandrel provided with a bore on said turret means and expandable claw members surrounding the mandrel and operable upon rotation of the mandrel for effecting a wrapping of the blank into a tubular body, means on said mandrel for flaring an expanded edge of the blank after it has been wrapped thereon, means for feeding the flat blank to the turret means and mandrel after the edges thereof have been expanded, said feeding means including accelerator rolls for synchronizing the feeding speed of said blank to the mandrel with the rotational movement of the turret means, a tool for engaging one of the expanded edges of the blank after it is wrapped by the mandrel and for flaring the said edge of the blank at one dwelling station of the turret means, said tool also being adapted to force the other edge of the blank into engagement with the flaring means on the mandrel, whereby said last mentioned flaring means will be operable at the same time the flaring tool engages the one edge of the blank for flaring said other expanded edge of the blank.

30. A device as set forth in claim 29 including a roll element engabeable with the mandrel for assisting in the wrapping of the blank around the mandrel.

31. A device as set forth in claim 29 including means comprising seaming chucks and rollers for applying and securing an end closure to at least one flared edge of the blank, means for synchronizing the movements of said end closure applying and securing means with the rotational movements of the turret means and means including an air discharge tube for directing air through the mandrel bore and against the end closure affixed to one flared edge of the blank for removing the wrapped blank from the mandrel.

32. In a device for forming tubular bodies from thin flat metallic blanks and the like, wherein the edges of the blanks have been previously expanded without flaring to facilitate the application of end closures thereto the combination of an intermittently rotatable turret, a rotatable mandrel and expandable claw-like elements surrounding said mandrel on the turret for receiving and wrapping a flat blank into a tube, a flanging tool for engaging and flaring an expanded edge of the blank wrapped on the mandrel at one dwell point of the turret, means for synchronizing the movements of the flanging tool with the movements of the turret, a seaming tool means for initially applying and securing an end closure to the expanded and flared edge of the blank at another dwell point of the turret, a second seaming tool means for completing the securing of the end closure to the said expanded and flared edge of the blank at another dwell point of the turret and means for synchronizing the movements of the said seaming tool means with each other, and with the intermittent rotational movements of the turret.

33. In a device for forming tubular bodies from thin flat metallic blanks and the like wherein the edges have been previously expanded without flaring to facilitate the application of end closures thereto, the combination of an intermittently rotatable turret, a rotatable mandrel and expandable claw-like elements surrounding said mandrel on the turret for receiving and wrapping a flat blank, means on one end of the mandrel for flaring one expanded edge of the blank wrapped therearound, a flanging tool for engaging and flaring another expanded edge of the blank after it is wrapped on the mandrel at one dwell point of the turret, said flanging tool also being effective during the flaring of said last mentioned expanded edge of the blank to cause the flaring of the first mentioned expanded edge of the blank on the flaring means located at said one end of the mandrel, a first seaming tool means for initially applying and securing an end closure to one of the flared and expanded edges of the blank at another dwell point of the turret and a second seaming tool means for completing the securing of the said end closure at a further dwell point of the turret, and means for synchronizing the movements of the flanging tool and seaming tool means with each other and with the intermittent rotational movement of the turret.

34. In a device for forming tubular bodies from flat thin metallic blanks and the like, wherein the edges thereof have been previously expanded without flaring to facilitate the application of end closures thereto, the combination of an intermittently rotatable turret, a rotatable mandrel and expandable claw-like elements surrounding said mandrel on the turret for receiving and wrapping a flat blank, a flanging tool for engaging and flaring an expanded edge of the blank after it is wrapped on the mandrel at one dwell point of the turret, a first seaming tool means for initially applying and securing an end closure to the flared and expanded edge of the wrapped blank at another dwell point of the turret, a second seaming tool means for completing the securing of the end closure at a further dwell point of the turret, means for feeding a blank to the mandrel and means synchonizing the operation of the feeding means with the intermittent rotation of the turret.

35. A device as set forth in claim 34 wherein said feeding means includes blank accelerator rolls.

36. A device as set forth in claim 34 including common means for actuating both of said seaming tool means.

37. In a device for forming tubular bodies as set forth in claim 34 wherein said mandrel is provided at one end thereof with blank edge flaring means, said flaring means being operative at the same time as said flanging tool to flare another expanded edge of the blank.

38. A device for forming tubular bodies as set forth in claim 34 wherein a roll means nestable with said mandrel and flanging tool is employed to facilitate the flaring of the expanded blank edge.

References Cited in the file of this patent

UNITED STATES PATENTS

| | | |
|---|---|---|
| 526,925 | Johnson et al. | Oct. 2, 1894 |
| 1,105,661 | Hookey | Aug. 4, 1914 |
| 1,107,956 | Jennings | Aug. 18, 1914 |
| 1,346,827 | Jennings | July 20, 1920 |
| 1,375,937 | Searle et al. | Apr. 26, 1921 |
| 1,622,558 | Wilson et al. | Mar. 29, 1927 |
| 1,876,094 | Taylor | Sept. 6, 1932 |
| 2,134,914 | Frame | Nov. 1, 1938 |
| 2,142,235 | Burns | Jan. 3, 1939 |
| 2,642,785 | Wittkuhns et al. | June 23, 1953 |
| 2,674,929 | Wittkuhns et al. | Apr. 13, 1954 |
| 2,677,489 | Hall et al. | May 4, 1954 |
| 2,719,467 | Wittkuhns et al. | Oct. 4, 1955 |

FOREIGN PATENTS

| | | |
|---|---|---|
| 589,997 | Germany | Dec. 27, 1933 |
| 648,563 | Germany | Aug. 6, 1937 |

UNITED STATES PATENT OFFICE
CERTIFICATE OF CORRECTION

Patent No. 3,053,209                          September 11, 1962

Clarence J. Smith et al.

It is hereby certified that error appears in the above numbered patent requiring correction and that the said Letters Patent should read as corrected below.

Column 3, line 26, for "turrent" read -- turret --; column 5, line 33, for "exponding" read -- expanding --; column 12, line 27, for "drife" read -- drive --; column 14, line 25, for "wrapping" read -- wrapped --; lines 57 and 58, for "an edge closure to a flared end" read -- an end closure to a flared edge --; same column 14, line 70, after "means," insert -- a wrapping mandrel mounted on said turret means, --; column 15, line 50, for "turrent" read -- turret --; column 16, line 30, for "engabeable" read -- engageable --.

Signed and sealed this 26th day of March 1963.

(SEAL)
Attest:

ESTON G. JOHNSON
Attesting Officer

DAVID L. LADD
Commissioner of Patents